United States Patent Office 3,284,701
Patented Nov. 8, 1966

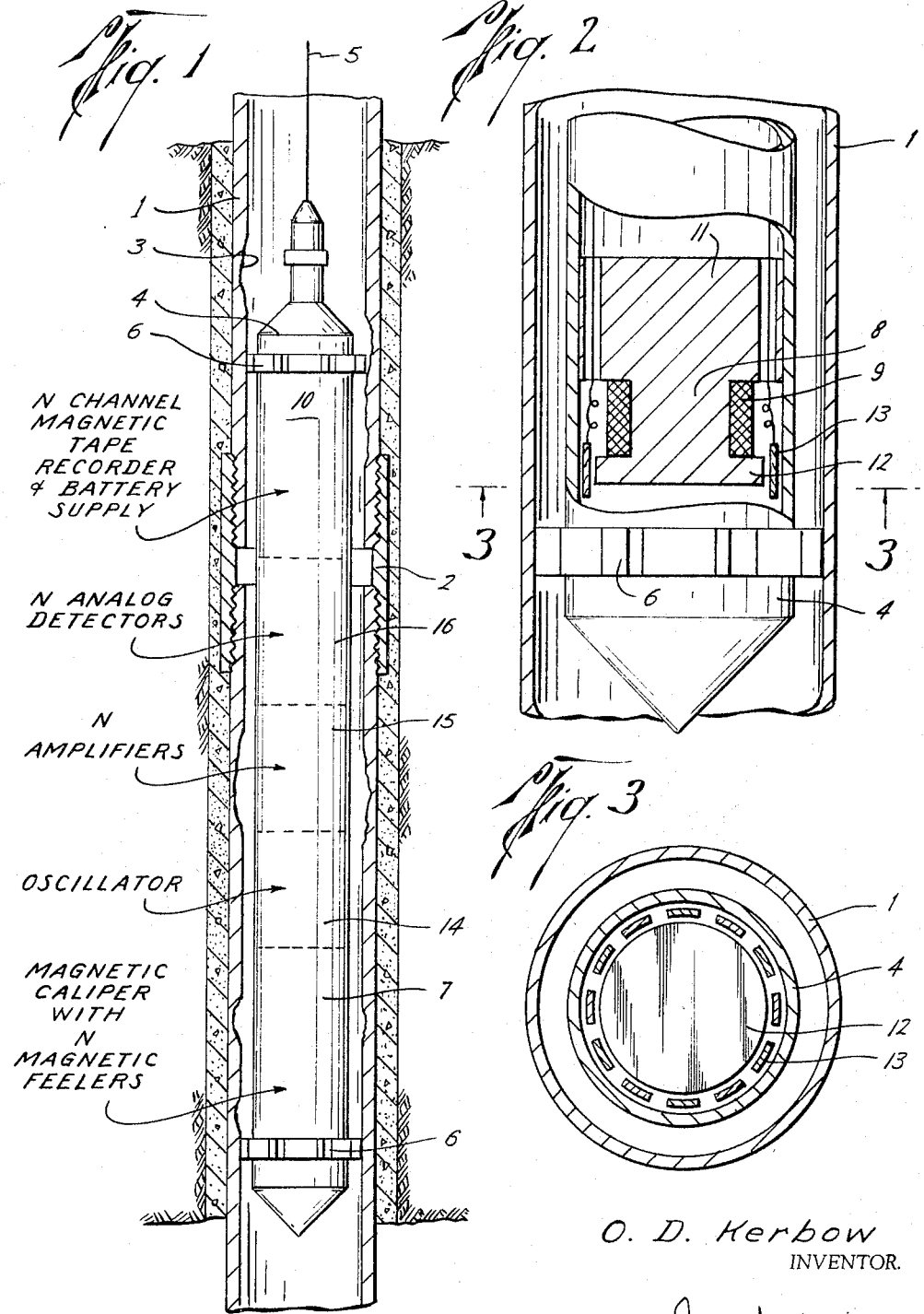

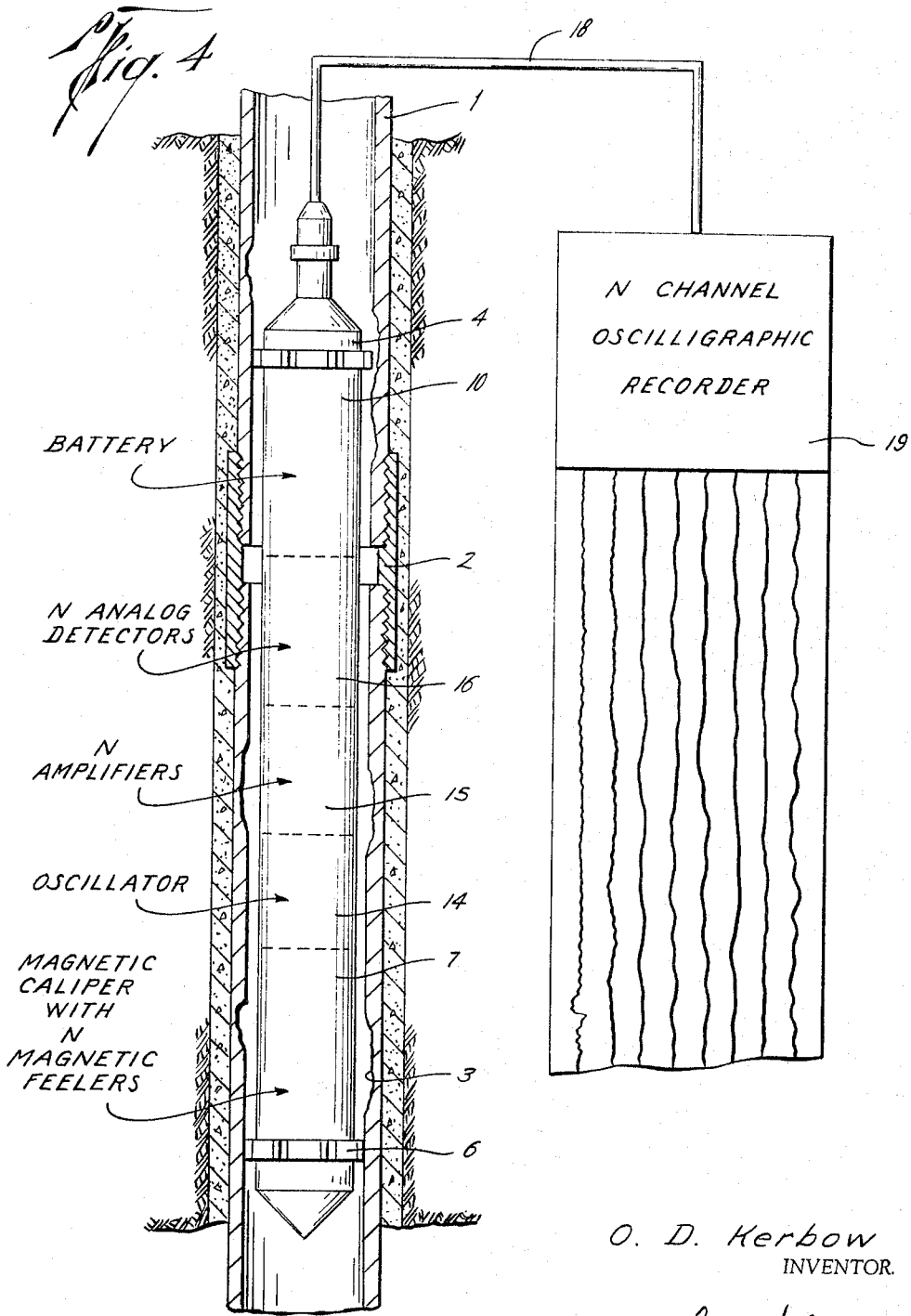

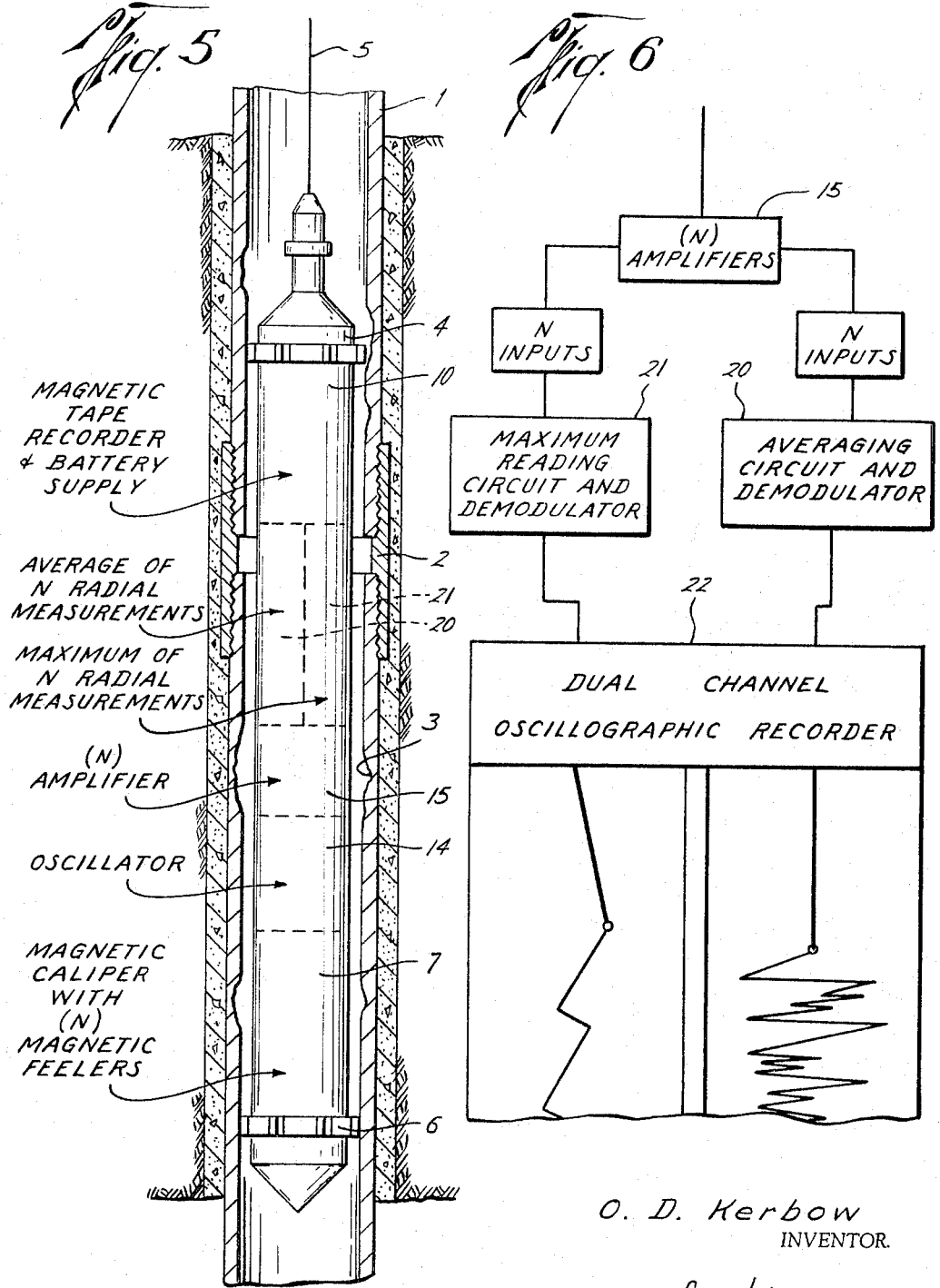

3,284,701
MAGNETIC TESTING APPARATUS FOR MEASURING INTERNAL DIAMETER AND SURFACE VARIATIONS IN WALL CASING
Odis Doyce Kerbow, Houston, Tex., assignor to Camco, Incorporated, Houston, Tex., a corporation of Texas
Filed Sept. 28, 1962, Ser. No. 226,952
2 Claims. (Cl. 324—37)

This invention relates to a device for calipering ferromagnetic tubular structures and to instrumentation and circuitry therefor and more particularly to an improvement for measuring internal diameter and surface variation in well casing and tubing while the pipe is positioned in a well hole.

To prevent tubing failure and obtain warnings for timely replacement or other remedial measures, a worth-while oil field practice is to inspect pipe wall surfaces for worn spots and the extent of corrision or erosion. Gauging devices responsive to outwardly pressured feeler contact points which drag on and follow surface irregularities have been in popular use but their readings lack reliability when surface films or coatings of paraffin and corrosion products are present and furthermore the point bearings may dig through and destroy a protective coating or score the metal in a manner to be an insipient fracture.

One of the objects of this invention is to provide an improved calipering instrument whose use cannot scratch or otherwise harm tubing and ignores nonferrous materials on the ferromagnetic pipe whose internal diameter is to be measured for changes indicative of pits and depressions in the surface of the metal pipe wall.

Another object is to provide calipering equipment involving an electromagnet for passage through a tubing with pole disks having peripheral faces equally radially spaced throughout their circumference from the circular tubing wall for delivery of flux across the radial space or gap surrounding the peripheral face of one pole disk and for flow through the low reluctance path of the tubing wall to the other pole whose face area is large compared with the peripheral face area of the delivery pole, together with a flux density measurement arrangement which includes flux sensing means positioned in the gap at the delivery pole to give a reading of flux density as affected by changes in gap length or reluctance and which reflect variations in diametrical dimensions internally of the tubing.

The invention will be better understood upon reference to the accompanying drawings wherein:

FIG. 1 is a vertical sectional view of a portion of a well installation and showing a caliper tool in elevation within a string of casing;

FIG. 2 is a fragmentary vertical section on a larger scale showing the detail of the tool component at which a measurement is taken;

FIG. 3 is a transvere section on line 3—3 of FIG. 2;

FIG. 4 shows a portion of a well in vertical section and a modified form of caliper tool;

FIG. 5 shows a well installation in vertical section and a further modified embodiment of tool components; and FIG. 6 is a block diagram of a circuit in a still further embodiment of the invention.

In the drawings a portion of a tubular casing 1 of ferromagnetic steel is shown cemented in lining relation to the wall of a well bore and constituted by a succession of joints or lengths of pipe connected end to end by coupling collars 2. When new, the pipe will have been produced to substantially true circularity and uniform wall thickness and diametrical dimension and upon installation of a string of pipe and except for the internal annular grooves at the several coupling collars, the pipe wall along its internal surface will initially be practically round and of continuing unbroken smoothness throughout the longitudinal extent of the pipe string. Following a period of use, the smooth and even surface is likely to be broken from loss of metal, as is represented by depressions 3 in the drawing. Inspection from time to time of wall condition will show up weaknesses and provide information for good maintenance.

The improved tool to be run through a well tubing for a quick inspection and a proper record of the extent of internal surface depressions and their location with reference to casing collars, whose depth if previously unknown can be determined from the record, is illustrated in FIGS. 1, 2 and 3 as comprising a number of co-operating components housed in a self contained tool assembly within a tubular body 4 suspended by a wire line 5. In transverse dimension, the tool body 4 is slightly smaller than the space across the tubing string and is fitted with top and bottom guide rings 6 having spaced ribs or teeth of a molded plastic material for a free slide bearing with minimum friction on the pipe internal surface whereby to center the tool and position its longitudinal axis coincident with the tubing string axis.

At least the lower portion of the tubular wall of the tool body 4 is of nonmagnetic material and surrounds a calipering unit 7 comprising an electromagnet and a group of magnetic flux feelers or sensing elements. The electromagnet has a spool-shaped core 8 of soft iron mounted coaxially of the tool body 4 and a solenoid or conductor wire coil 9 wound on the core and connected in an electric circuit having an oscillator 14 and a suitable switch for directing current pulses to the coil from a supply source or battery conveniently mounted in the section 10 of the tool body. It will be noted from FIG. 2 that the spool-shaped core 8 is specially shaped to provide top and bottom pole pieces 11 and 12 in the form of circular disks differing from one another in longitudinal and diametrical dimensions so that the peripheral face area of the upper or south pole disk 11 is many times larger, both circularly and longitudinally, than the peripheral face area of the lower or north pole disk 12. Such peripheral pole faces are coaxial with the guide rings 6 and are positioned thereby for a normal concentric relation with the pipe internal surface and gap space uniformity throughout the circumference of the respective pole disks.

Mounted within the nonmagnetic tool body wall and surrounding the perimeter of the peripheral face area of the north pole disk 12 is a group of circularly spaced apart magnetically responsive sensing or flux feeling elements 13 consisting of multiple-turn wire coil or Hall effect wafer elements arranged in an indicator circuit later to be described. Flux provided by the electromagnet leaves the north pole 12 close to the sensing elements 13 and follows a path passing through the sensing elements to and through the ferromagnetic tubing wall and then across the relatively small gap at the large area gathering face of the south pole 11. Flux passing through each sensing element 13 is measured by it and produces an output voltage inversely proportional to the reluctance of gap length between the tubing wall and the pole from which the flux originates.

In any magnetic circuit, total flux is a function of magnetomotive force and the reluctance of the circuit. In the magnetic circuit of the electromagnet as here disclosed, the high permeability of that part of the circuit containing the ferromagnetic tubing wall and across the short gap to the large face area of the south pole, provides such a low reluctance path as to be negligible relative to the reluctance to flux passing through the sensing elements in the larger gap at the comparatively small face area of the north pole. Accordingly, the reluctance affecting flux density which is sensed and the resulting voltage output is primarily proportional normally to the length of the gap containing the sensing elements. Therefore, measurements obtained will truly represent gap length and measurement recordings will show collar locations, easily recognizable as such, and will also show depressions, such as indicated at 3, and their longitudinal extent and depth below the normal internal surface.

Tool size and other factors limit the number of sensing elements to be employed and with each element sampling a small percent of wall surface, a predetermination of N number of sensing elements is made for inspection of the desired portion of the tubing surface. Signals from each sensing element 13 pass through an amplifier of a group 15, if necessary, and in the embodiment of FIG. 1 are fed into an analog detector of a bank 16. The output from each detector is a measure of the radius to the internal surface of the tubing wall at any sensing element is individually recorded on a channel of a magnetic tape recorder in the housing section 10. On subsequent play back of the magnetic tape, the several N channel records of caliper information are reproduced for visual presentation by feeding each N output into a channel of an oscillographic recorder.

The arrangement of magnetic calipering with sensing elements and measuring circuitry as just described is shown in FIG. 4 except that the magnetic tape recorder has been omitted from the tool body assembly and a combined suspension and multiple-conductor cable 18 is used in place of the previously referred to wire line 5. In this instance, the N signals are transmitted from the detectors 16 directly by the multiple-conductor cable 18 to an N channel oscillographic recorder 19 located above ground at or near the wellhead for record and immediate visual reading during progress of the testing operation.

In another arrangement for down hole use on a solid wire line, the same units are combined as in FIG. 1 except that the analog detector is replaced by two separate components 20 and 21. In this case, the several signals from all sensing elements, after amplification if necessary, are fed in two electric circuits. One circuit contains the component 20 which selects the maximum of the N radial measurements and converts it into analog form. The other circuit contains the component 21 which averages the N radial measurements and converts the average into an analog signal. Both analog signals are then recorded by a tape recorder housed within the tool body. The tape record can be played back later and reproduced on a chart by a dual channel oscillographic recorder.

For an immediately observable record of the maximum and the average of radial measurements being taken during tool travel within a tubing, the assembly of FIG. 5 can be modified by omitting the built-in tape recorder and by suspending the tool by a dual conductor cable which joins the components 20 and 21 to a dual channel oscillographic recorder 22 located at the wellhead. This arrangement is conveniently illustrated in the block circuit diagram of FIG. 6. If desired, the use of a signal conductor and a multiplex system will enable each of the analog signals from the maximum and the average circuits to modulate a carrier of different frequency for transmission to the surface to be filtered and demodulated to obtain two channels of analog information and reproduction by the dual channel oscillographic recorder.

What is claimed is:

1. Calipering means for determining internal surface dimensions of a ferromagnetic well tubing wall comprising:

an alternating current electromagnet adapted for longitudinal movement in said tubing and including a spool shaped core whose axially spaced apart cylindrical poles are disk shaped and whose peripheral faces are dimensioned for presentation in radial gap relationship to the tubing wall and having an alternating current solenoid positioned between said disks, one of said pole disks having a longitudinal peripheral surface area greater than the longitudinal peripheral face area of the other pole disk, a plurality of circularly spaced apart flux sensing elements arranged in circumferential alignment with one another and fixedly positioned in the flux path surrounding the perimeter of said other pole disk for producing an output voltage proportional to the reluctance of said gap, indicator means electrically connected with each sensing element and responsive to variations in magnitude of output voltage at any instant during relative longitudinal movement of the electromagnet and the tubing, said indicator means including separate circuits each connected with all of the sensing elements, maximum voltage reading circuit and demodulator means in one of the circuits connecting with all sensing elements, voltage averaging circuit and demodulating means in another of the circuits connecting with all of the sensing elements, and a recorder connected with and actuated in response to demodulated signals received from the last two mentioned circuits.

2. The calipering means of claim 1 wherein the one pole disk is circumferentially larger than the other pole disk thereby having a smaller radial gap relationship to the tubing wall.

References Cited by the Examiner
UNITED STATES PATENTS

| | | | |
|---|---|---|---|
| 2,554,844 | 5/1951 | Swift | 324—47 |
| 2,770,773 | 11/1956 | Cooley | 324—34 |
| 2,963,644 | 12/1960 | Nuttall | 324—37 |
| 2,992,390 | 7/1961 | DeWitte | 324—37 |
| 3,015,063 | 12/1961 | Ownby | 324—37 |
| 3,114,876 | 12/1963 | Schuster | 324—37 |

WALTER L. CARLSON, *Primary Examiner.*

RICHARD B. WILKINSON, *Examiner.*

F. A. SEEMAR, R. J. CORCORAN,
*Assistant Examiners.*